(12) United States Patent
Maehara

(10) Patent No.: US 8,164,313 B2
(45) Date of Patent: Apr. 24, 2012

(54) POWER GENERATION CONTROLLING DEVICE FOR VEHICLES, WHICH DEVICE HAS BI-DIRECTIONAL COMMUNICATION FUNCTION WITH EXTERNAL CONTROL UNIT

(75) Inventor: Fuyuki Maehara, Nagoya (JP)

(73) Assignee: Denso Corporation, Kariya (JP)

( * ) Notice: Subject to any disclaimer, the term of this patent is extended or adjusted under 35 U.S.C. 154(b) by 571 days.

(21) Appl. No.: 12/320,738

(22) Filed: Feb. 3, 2009

(65) Prior Publication Data

US 2009/0195223 A1    Aug. 6, 2009

(30) Foreign Application Priority Data

Feb. 6, 2008  (JP) ................................ 2008-025823

(51) Int. Cl.
*H02P 9/48* (2006.01)
(52) U.S. Cl. .......................................... 322/59; 322/24
(58) Field of Classification Search .................... 322/59, 322/89, 24, 44, 22
See application file for complete search history.

(56) References Cited

U.S. PATENT DOCUMENTS

| | | | |
|---|---|---|---|
| 6,865,474 B2 | 3/2005 | Braun et al. | |
| 7,235,952 B2 | 6/2007 | Maehara | |
| 2005/0135133 A1* | 6/2005 | Maehara | 363/144 |

FOREIGN PATENT DOCUMENTS

| | | |
|---|---|---|
| DE | 102 57 557 A1 | 7/2004 |
| JP | A-2002-325085 | 11/2002 |
| JP | A-2005-176422 | 6/2005 |

OTHER PUBLICATIONS

Notification of the First Office Action for corresponding Chinese Patent Application No. 200910005316.9, mailed on Nov. 2, 2010 (w/ English translation).
Specks et al., "Lin—Protocol, Development Tools, and Software Interfaces for Local Interconnect Networks in Vehicles," *9th International Conference on Electronic Systems for Vehicles*, Oct. 5/6, 2000, pp. 1-24, VDI-Verlag GmbH.
Extended European Search Report for EP Application No. 09001537. 1-2206, Issued on May 20, 2009, European Patent Office.

* cited by examiner

*Primary Examiner* — Dang Le
(74) *Attorney, Agent, or Firm* — Oliff & Berridge, PLC

(57) ABSTRACT

A power generation controlling device for vehicle includes a communication controlling circuit, a power generation voltage and excitation current controlling circuit, and a communication frame processing circuit. The communication controlling circuit communicates with an ECU using a communication frame. The power generation voltage and excitation current controlling circuit controls power generation based on power generation control information in the received communication frame. The communication frame processing circuit decodes contents of power generation control information (i.e., signal switching data) included in the communication frame based on a signal switching bit in the same communication frame. Two types of contents or more that are switched based on the signal switching bit are assigned to the power generation control information in the communication frame. The power generation voltage and excitation current controlling circuit controls power generation based on the power generation control information of which the contents are specified by the switching information.

6 Claims, 7 Drawing Sheets

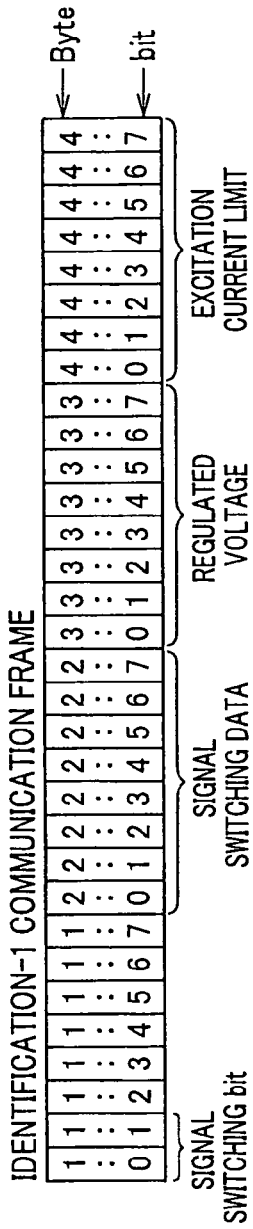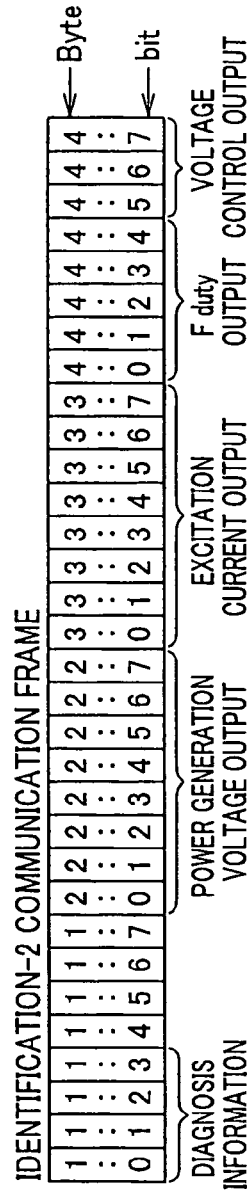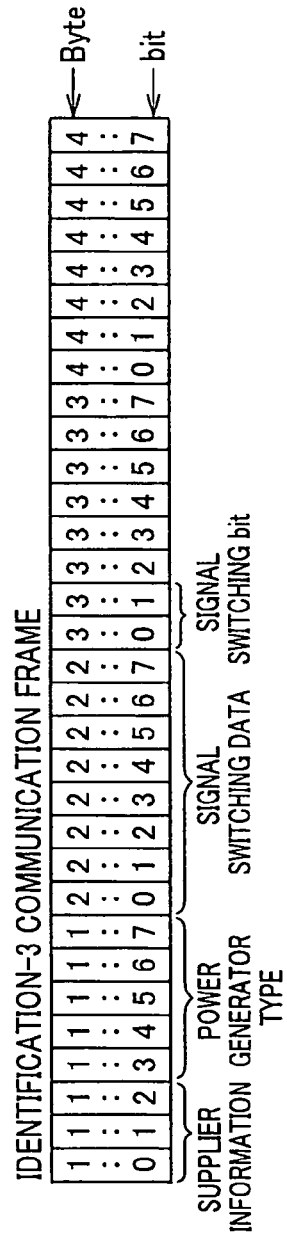

FIG. 4

| SIGNAL SWITCHING bit | | CONTROL CONTENT | DATA bit | | | | |
|---|---|---|---|---|---|---|---|
| | | | 1 | 2 | 3 | 4 | 5 |
| | | | SIGNAL SWITCHING DATA | | | | |
| 0 | 0 | IDLE ROTATION STABILIZATION CONTROL | PERFORMED/ NOT PERFORMED | CONTROL METHOD | CONTROL CONSTANT K=1, 2, 4, 8 | | CONTROL CONSTANT K APPLIED/ NOT APPLIED |
| 0 | 1 | GRADUAL EXCITATION DOWN-TIME/ POWER GENERATION RESTRICTION RELEASE VOLTAGE/ OVERHEATING CONTROL | GRADUAL EXCITATION DOWN-TIME | | POWER GENERATION RESTRICTION RELEASE VOLTAGE | | OVERHEATING CONTROL TEMPERATURE |
| 1 | 0 | RESTRICTION F duty | RESTRICTION F duty | | | | |
| 1 | 1 | STANDARD SETTING | GRADUAL EXCITATION SPEED | | | | |

POWER GENERATION CONTROLLING DEVICE FOR VEHICLES, WHICH DEVICE HAS BI-DIRECTIONAL COMMUNICATION FUNCTION WITH EXTERNAL CONTROL UNIT

CROSS REFERENCE TO RELATED APPLICATION

The present application relates to and incorporates by reference Japanese Patent application No. 2008-25823 filed on Feb. 6, 2008.

BACKGROUND OF THE INVENTION

1. Field of the Invention

The present invention relates generally to power generation controlling devices for vehicles, and, in particular to a power generation controlling device that controls power generation of a power generator mounted on a vehicle, such as a passenger car and a truck.

2. Description of the Related Art

In recent years, for controlling a vehicle system, reduced idling rotation and reduced friction have been made to improve vehicle fuel efficiency. On the other hand, because of increase in an electrical load caused by increasing power consumption in the vehicle system, torque fluctuation in an engine caused by operation of a power generator significantly affects behavior of the engine rotation. Therefore, through control that allows coordination between engine control and power generation control of the power generator, both stable power supply and stable idle rotation can be achieved. Control that achieves improvement in fuel efficiency by a deceleration regeneration effect can be performed. To actualize the above, a large amount of information is required to be exchanged between an engine controlling device and a power generation controlling device mounted on the power generator. For example, in Japanese Patent Laid-open Publication No. 2002-325085, digital communication, such as that using local interconnect network (hereinafter referred to as LIN) protocol, that requires little increase in communication lines and can be achieved at a low cost, is used.

The digital communication using LIN protocol, disclosed in Japanese Patent Laid-open Publication No. 2002-325085, can be achieved at a low cost. However, communication speed is slow. Therefore, when communication frames increases due to increasing information, communication (i.e., transmission and reception) are required to be performed divided over several transmitting and receiving operations. As a result, communication delay increases. Therefore, the method disclosed in Japanese Patent Laid-open Publication No. 2002-325085 is not suitable for communication of signals, such as power generation information and power generation amount information in which communication delay becomes a problem. An idea to solve this problem, a method in which frequency of communication frames requiring speed is increased can be considered. However, communication schedule becomes complicated so that designing overall software becomes difficult. Therefore, a method such as this is difficult to use.

SUMMARY OF THE INVENTION

The present invention has been achieved in light of the above-described issues. An object of the present invention is to provide a power generation controlling device that can suppress occurrence of communication delay and perform high-quality transmission of many types of signals without complicating communication schedule.

To solve the above-described issues, a power generation controlling device of the present invention controls a power generation state of a power generator by intermittently applying an excitation current flowing to an excitation winding of the power generator. The power generation controlling device includes a communication controlling means that performs bi-directional, serial communication with an external controlling device and receives a communication frame periodically sent from the external controlling device; a power generation controlling means that controls power generation of the power generator based on power generation control information included in the communication frame received by the communication controlling means; and a communication frame processing means that decodes contents of power generation control information included in the communication frame based on switching information included in the same communication frame. Two types of contents or more that are switched based on the switching information are assigned to the power generation control information included in the communication frame. The power generation controlling means controls power generation based on the power generation control information of which the contents are specified by the switching information.

Because the power generation control information and the switching information are included in the communication frame and the contents of the power generation control information are switched based on the switching information, many types of power generation control information can be transmitted. Occurrence of communication delay can be suppressed. Because transmission and reception of the communication frame can be performed using a conventional method, communication schedule does not become complicated. Moreover, as a result of power generation control information requiring communication speed being preferentially included in the communication frame, the required communication speed can be ensured. High-quality communication including many types of power generation control information can be performed.

In addition, a content of the power generation controlling information of which the contents can be switched based on the switching information is preferably reset to a default value when a new content is not indicated by the external controlling device for a predetermined period. In a power generator that is used in harsh noise and temperature environments, the contents of the power generation controlling information held by the power generation controlling device may be changed as a result of external power supply noise and the like. However, even in such instances, power generation control can be performed based on default values after a predetermined period because content of the power generation controlling information that is not updated is periodically set to a default value. Therefore, reduced power generation states and excessive voltage states do not continue for long periods of time. Serious damage, such as breakdown while on a road caused by a dead battery, can be prevented from occurring.

The communication controlling means preferably transmits the received switching information towards the external controlling device at a next transmission timing. Even when the power generation controlling device receives power generation information including content that is erroneous due to external noise, because the erroneous content is sent to the external controlling device at a next transmission timing, the power generation information including correct contents can be retransmitted at a next transmission timing. As a result, breakdown while on a road caused by a continuous abnormal power generation state can be prevented from occurring.

BRIEF DESCRIPTION OF THE DRAWINGS

In the accompanying drawings:

FIGS. 3A to 3C are diagrams showing contents of a communication frame transmitted and received between the power generation controlling device and the ECU;

FIG. 4 is a diagram showing contents of power generation controlling information corresponding to switching information included in an Identification-1 (ID1) communication frame;

DETAILED DESCRIPTION OF THE PREFERRED EMBODIMENT

Figure 1:
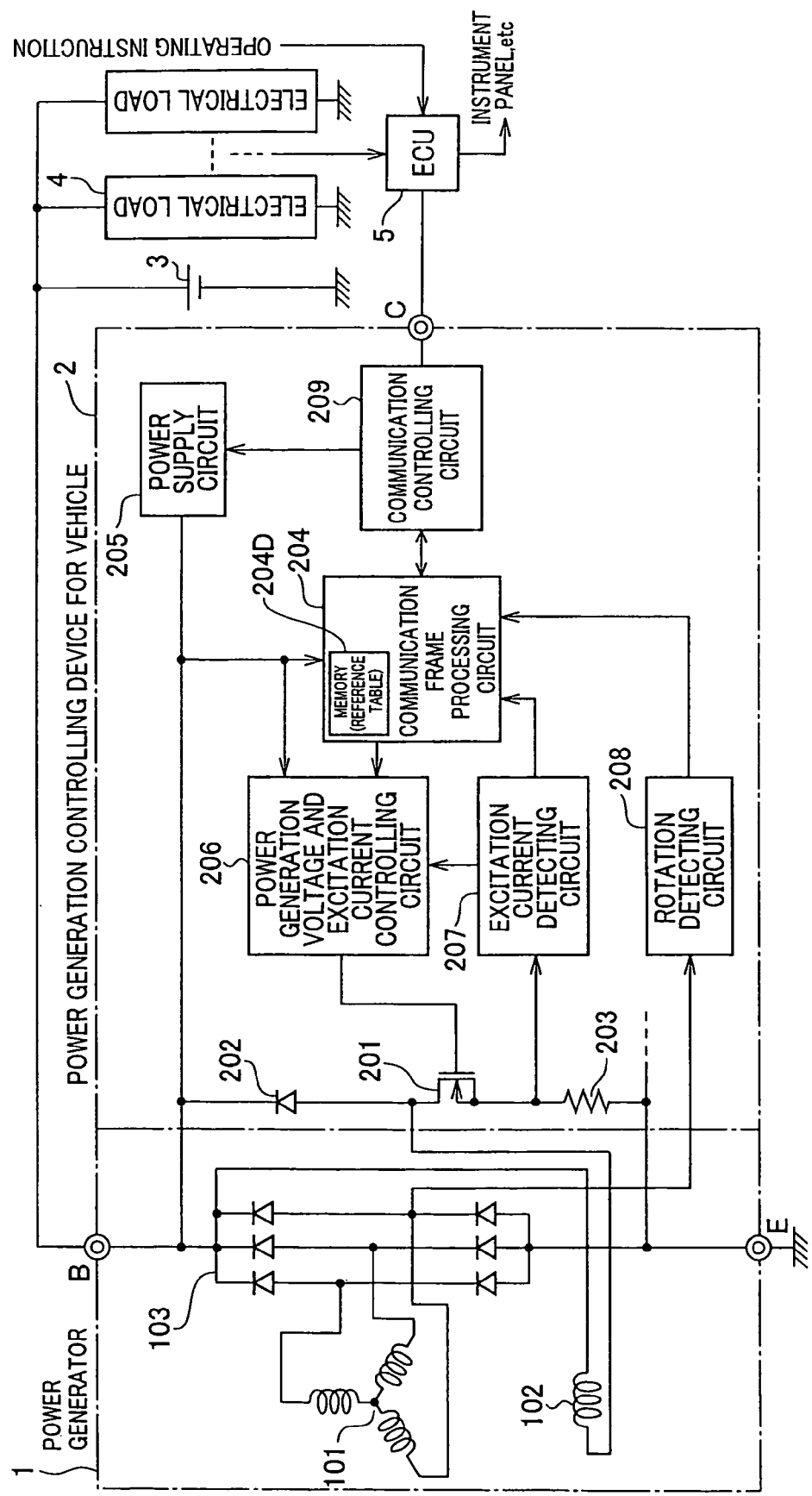
FIG. 1 is a diagram of a configuration showing a power generation controlling device according to an embodiment of the present invention.

An embodiment of a power generation controlling device mounted on a vehicle of the present invention will hereinafter be described with reference to the drawings. FIG. 1 is a diagram showing a configuration of a power generation controlling device for vehicle according to an embodiment of the present invention. Connection states between the power generation controlling device and a power generator, a battery, electrical loads, and an electronic control unit (ECU) are also shown.

In FIG. 1, a power generation controlling device 2 controls a voltage at an output terminal (Battery (B) terminal) of a power generator 1 to a predetermined regulated voltage setting value (for example, 14V). The power generation controlling device 2 has, in addition to the B terminal, a communication terminal (C terminal) and a ground terminal (E terminal). The B terminal is connected to a battery 3 and various electrical loads 4, via a predetermined charging line. The C terminal is connected to an ECU 5 serving as an external controlling device. The E terminal is connected to a frame of the power generator 1. In FIG. 1, the power generation controlling device 2 is shown in parallel with the power generator 1. However, in actuality, the power generation controlling device 2 is included within the power generator 1.

Figure 2A:
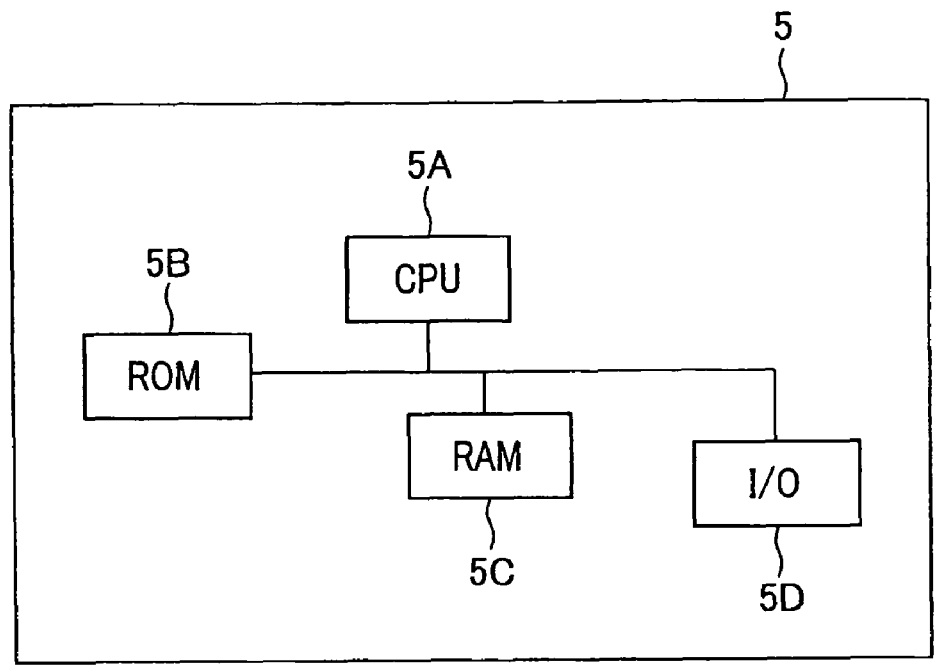
FIG. 2A is a diagram showing a detail block diagram of an electronic control unit (ECU) in FIG. 1.

As shown in FIG. 2A, the ECU 5 includes a known computer system, which comprises a CPU (central processing unit) 5A, a ROM (read-only memory) 5B, a RAM (random access memory) 5C, and an I/O (input/output unit) 5D. Of these components, the CPU 5A reads predetermined programs from the ROM 5B and processes the read programs in association with the RAM 5C. The programs include a process shown in FIG. 7 (steps 301 to 302). The RAM 5C works as a work area for the CPU 5A. The I/O unit 5D is a device that receives and transmits signals from and to external devices.

The power generator 1 includes a three-phase stator winding 101, an excitation winding 102, and a rectification circuit 103. The stator winding 101 is included in a stator. The excitation winding 102 is included in a rotor. The rectification circuit 103 is provided to perform full-wave rectification on a three-phase output from the stator winding 101. An output voltage from the power generator 1 is controlled by the power generation controlling device 2 controlling electrification of the excitation winding 10 (i.e., duty control) accordingly.

Next, a detailed configuration and operations of the power generation controlling device 2 will be described. As shown in FIG. 1, the power generation controlling device 2 includes an N-channel metal-oxide semiconductor field-effect transistor (MOS-FET) 201, a circulating diode 202, a sense resistor 203, a communication frame processing circuit 204, a power supply circuit 205, a power generation voltage and excitation current controlling circuit 206, an excitation current detecting circuit 207, a rotation detecting circuit 208, and a communication controlling circuit 209.

The MOS-FET 201 is serially connected to the excitation winding 102. When the MOS-FET 201 is ON, an excitation current flows to the excitation winding 102. The circulating diode 202 is connected in parallel to the excitation winding 102. When the MOS-FET 201 is OFF, the circulating diode 202 circulates the excitation current.

The power supply circuit 205 generates a predetermined operation voltage. The power generation voltage and excitation current controlling circuit 206 performs power generation control, such as maintaining an output voltage from the power generator 1 at a constant voltage and restricting the excitation current to be a set value or below. Contents of power generation control and control parameters are set based on power generation control information (described in detail, hereafter) included in a communication frame sent from the ECU 5. The excitation current detecting circuit 207 detects the excitation current flowing to the excitation winding 102 based on potential at a source of the MOS-FET 201. The sense resistor 203 for excitation current detection is connected to the source of the MOS-FET 201. The excitation current detecting circuit 207 detects the excitation current based on a voltage at a terminal of the sense resistor 203 generated when the excitation current flows between the source and a drain of the MOS-FET 201, and through the sense resistor 203. The rotation detecting circuit 208 detects a rotation count of the power generator 1 by monitoring a phase voltage appearing at any phase of the stator winding 101. The rotation detecting circuit 208 then outputs a voltage corresponding to the detected rotation count. The communication controlling circuit 209 performs bi-directional, serial communication with the ECU 5 via the C terminal and receives a communication frame periodically sent from the ECU 5. The communication controlling circuit 209 also transmits a communication frame towards the ECU 5 via the C terminal. The communication frame processing circuit 204 decodes contents of the communication frame sent from the ECU 5 and composes the communication frame sent towards the ECU 5.

Figure 2B:
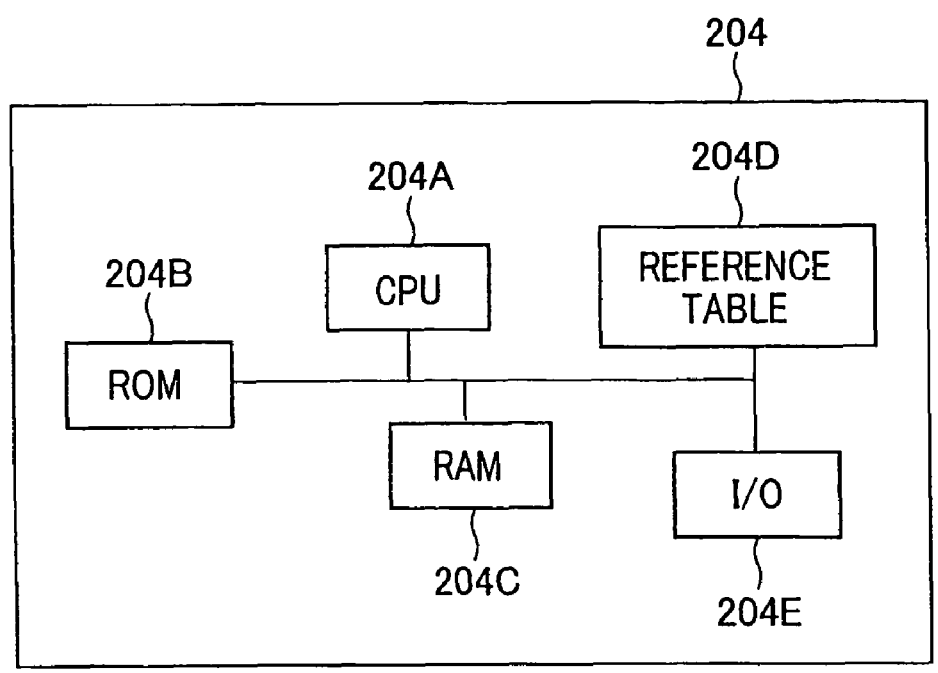
FIG. 2B is a diagram showing a detail block diagram of a communication frame processing circuit in FIG. 1.
Figure 8:
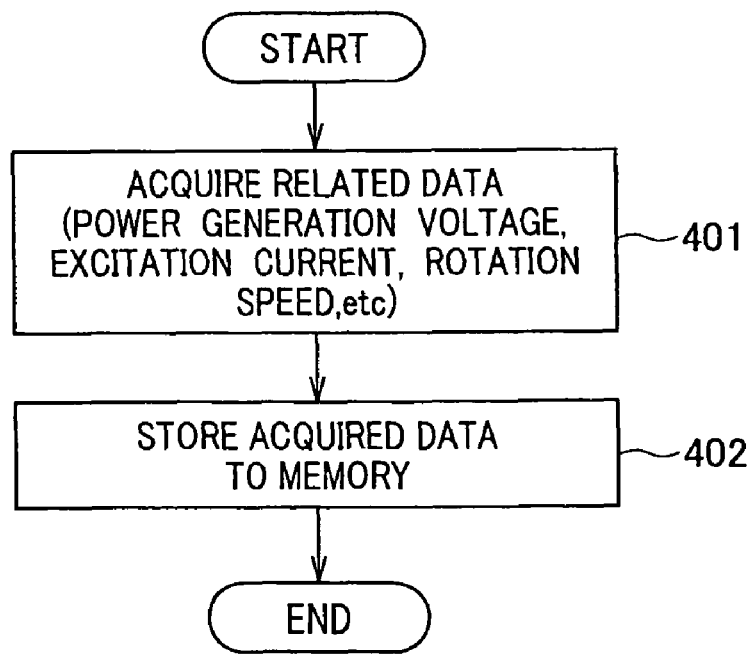
FIG. 8 is a flowchart showing operations performed by the communication frame processing circuit

As shown in FIG. 2B, the communication frame processing circuit 204 also includes a known computer system, which comprises a CPU (central processing unit) 204A, a ROM (read-only memory) 204B, a RAM (random access memory) 204C, and an I/O (input/output unit) 204E. In addition, a reference table 204D is included in the processing circuit 204. Of these components, the CPU 204A reads predetermined programs from the ROM 204B and processes the read-out programs in association with the RAM 204C. The programs include a process shown in FIG. 8 (steps 401 to 402). The RAM 204C works as a work area for the CPU 204A. The I/O unit 204E is a device that receives and transmits signals from and to external devices. The reference table 204D includes contents of the data corresponding to switching information (described later).

The communication controlling circuit 209 corresponds to a communication controlling means. The power generation voltage and excitation current controlling circuit 206 corresponds to a power generation controlling means. The communication frame processing circuit 204 corresponds to a communication frame processing means. The power generation controlling device 2 according to the embodiment is configured as described above. Next, the operations will be described.

According to the embodiment, power generation control is performed as follows. The communication frame transmitted and received between the power generation controlling device 2 and the ECU 5 includes a signal switching bit. The power generation controlling device 2 that has received the communication frame switches contents of signal switching data included in the same communication frame based on the signal switching bit. The signal switching bit corresponds to switching information. The signal switching data corresponds to the power generation control information.

FIGS. 3A to 3C are diagrams of contents of the communication frame transmitted and received between the power generation controlling device 2 and the ECU 5. In FIG. 3A, contents of an identification-1 communication frame (referred to hereinafter, as an "ID1 communication frame") transmitted from the ECU 5 towards the power generation controlling device 2 are shown. In FIG. 3B and FIG. 3C, contents of identification communication frames (a communication frame in FIG. 3B is referred to, hereinafter, as an "ID2 communication frame"; and a communication frame in FIG. 3C is referred to, hereinafter, as an "ID3 communication frame") transmitted from the power generation controlling device 2 towards the ECU 5 are shown.

As shown in FIG. 3A, the ID1 communication frame includes the signal switching bit, the signal switching data, a regulated voltage, and an excitation current limit. The signal switching bit is two-bit data indicating a type of power generation control information indicated by the signal switching data. At the same time, the two-bit data specifies content of control performed by the power generation voltage and excitation current controlling circuit 206. The regulated voltage is a target voltage value of when the output voltage (a B terminal voltage or a battery 3 terminal voltage) of the power generator 1 is controlled at a constant voltage. The excitation current limit is a maximum value of the excitation current flowing to the excitation winding 102 when the excitation current is restricted. According to the embodiment, in addition to the signal switching data of which the contents are switched based on the signal switching bit, all pieces of data including the regulated voltage and the excitation current limit are used as the power generation controlling information.

FIG. 4 is a diagram of a correspondence between the signal switching bit included in the ID1 communication frame, and the control content and the signal switching data contents. As shown in FIG. 4, when the signal switching bit is set to "00", "idle rotation stabilization control" is specified as the control content. Whether the idle rotation stabilization control is performed, a control method, a control constant K, and whether the control constant K is applied are assigned to each bit of the signal switching data. When the signal switching bit is set to "01", "gradual excitation down-time/power generation restriction release voltage/overheating control" is specified as the control content. A gradual excitation down-time, a power generation restriction release voltage, and an overheating control temperature are assigned to each bit of the signal switching data. When the signal switching bit is set to "10", "restriction F duty" is specified as the control content. A restriction F duty value is assigned to each bit of the signal switching data. When the signal switching bit is set to "11", "standard setting" is specified as the control content. A gradual excitation speed value is assigned to each bit of the signal switching data.

As shown in FIG. 3B, the ID2 communication frame includes diagnosis information, a power generation voltage output, an excitation current output, an F duty output, and a voltage control output. The diagnosis information is data indicating a result of a diagnosis on whether an abnormality is present, performed by an abnormality detecting circuit (not shown). The power generation voltage output is a value of a detected B terminal voltage. The excitation current output is an excitation current value detected by the excitation current detecting circuit 207. The F duty output is a value of a drive duty of the MOS-FET 201 that applies the excitation current to the excitation winding 102.

As shown in FIG. 3C, the ID3 communication frame includes supplier information, a power generator type, the signal switching data, and the signal switching bit. The signal switching data and the signal switching bit hold respective values of the signal switching data and the signal switching bit included in the ID1 communication frame sent from the ECU 5 immediately before a transmission timing of the ID3 communication frame.

When a key switch (not shown) is turned ON, the ECU 5 transmits an operation start signal towards the power generation controlling device 2. When the communication controlling circuit 209 within the power generation controlling device 2 receives the operation start signal sent from the ECU 5, the communication controlling circuit 209 sends a power ON signal to the power supply circuit 205. As a result, power is supplied to each circuit of the power generation controlling device 2, and the power generation controlling device 2 starts operation. Subsequently, power generation control is performed based on the various pieces of data included in the communication frame sent from the ECU 5 in adherence to a predetermined communication schedule.

Figure 7:
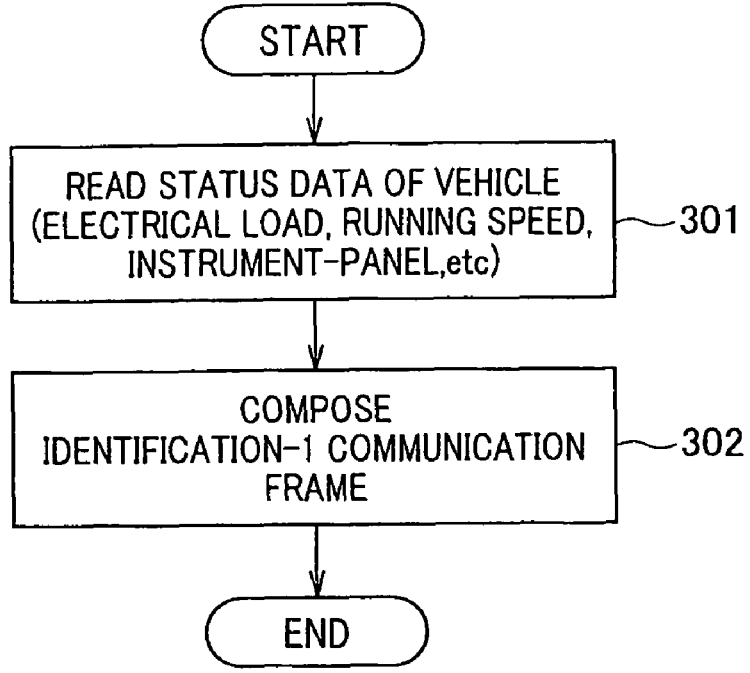
FIG. 7 is a flowchart showing operations performed by the ECU.

As shown in FIG. 7, according to the predetermined communication schedule, the ECU 5 periodically reads status data showing various conditions of the vehicle (Step 301). Then, ECU 5 determines control data such as regulated voltage value, the excitation current limit and the signal switching bit to be included in the ID1 communication frame and composes the frame (Step 302). Detail steps including the communication schedule timings are described as below.

Figure 5:
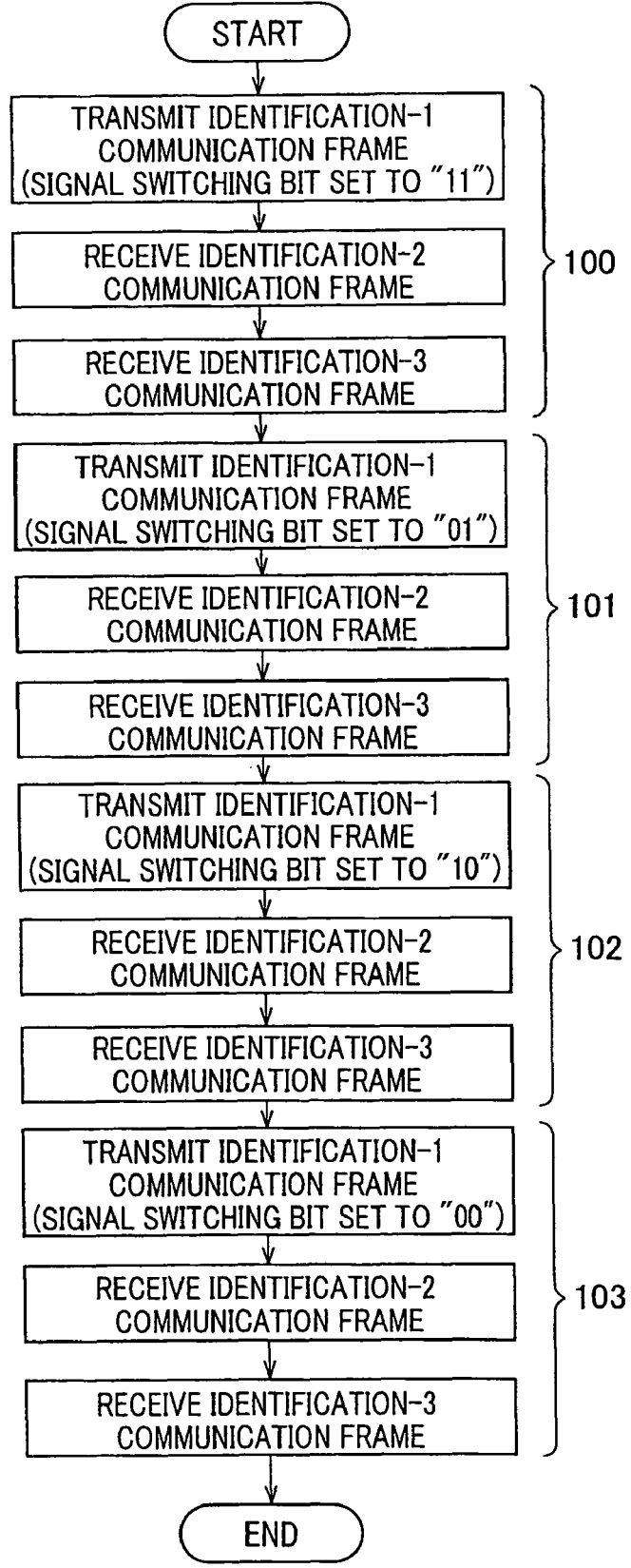
FIG. 5 is a diagram showing timings indicating a communication schedule of the ECU.

FIG. 5 is a diagram of timings indicating the communication schedule of the ECU. The ECU 5 composes the ID1 communication frame in which the signal switching bit is set to "11" and transmits the ID1 communication frame towards the power generation controlling device 2. The ECU 5 then receives the ID2 communication frame and the ID3 communication frame (Step 100).

Next, the ECU 5 composes the ID1 communication frame in which the signal switching bit is set to "01" and transmits the ID1 communication frame towards the power generation controlling device 2. The ECU 5 then receives the ID2 communication frame and the ID3 communication frame (Step 101).

In a similar manner, the ECU 5 composes the ID1 communication frame in which the signal switching bit is set to "10" and transmits the ID1 communication frame towards the power generation controlling device 2. The ECU 5 then receives the ID2 communication frame and the ID3 communication frame (Step 102).

The ECU 5 composes the ID1 communication frame in which the signal switching bit is set to "00" and transmits the ID1 communication frame towards the power generation controlling device 2. The ECU 5 then receives the ID2 communication frame and the ID3 communication frame (Step 103).

In this way, a communication cycle in which ID1 communication frame transmission, and ID2 communication frame and ID3 communication frame reception form a set is repeatedly performed with changes made to the content of the signal switching bit within the ID1 communication frame.

Figure 6:
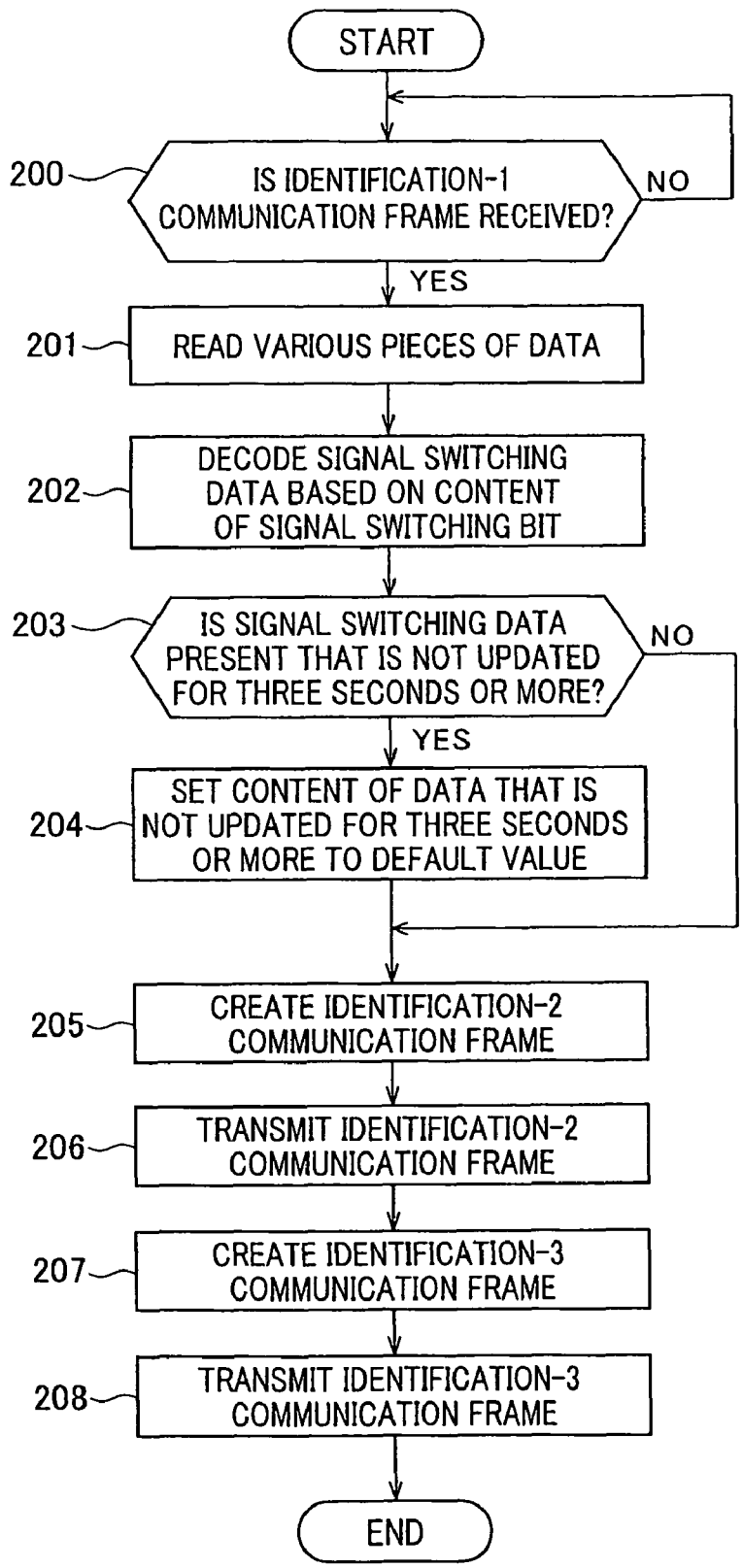
FIG. 6 is a flowchart showing operations performed by the power generation controlling device that has received the ID1 communication frame from the ECU.

FIG. 6 is a flowchart of the operations of the power generation controlling device 2 that has received the ID1 communication frame from the ECU 5. The communication frame processing circuit 204 judges whether the ID1 communication frame is received (Step 200). When the ID1 communication frame is not received, the judgment is NO. The judgment is repeatedly performed.

When the ID1 communication frame is received, the judgment at Step 200 is YES. Next, the communication frame processing circuit 204 reads the various pieces of data included in the ID1 communication frame (Step 201).

Practically, as shown in FIG. 2B, in the communication frame processing circuit 204, the CPU 204A works to read data, such as the power generation voltage, the excitation current, and the F duty output, and store those read data in the RAM 204C. This reading and storing operations are carried out periodically at given intervals. In addition, the CPU 204A responds to reception of the ID1 communication frame which comes from ECU 5 in a manner such that the CPU 204A reads the newest data from the RAM 204C. Based on the format shown in FIG. 3B, the CPU 204A produces the ID2 communication frame using the newest read data. The production of the ID2 communication frame is carried out periodically whenever the ID1 communication frame is received at intervals.

After reading the various pieces of data, the communication frame processing circuit 204 decodes the contents of the signal switching data based on the signal switching bit included in the read pieces of data (Step 202).

As shown in FIG. 2B, when the communication frame processing circuit 204 decodes the contents of the signal switching data, the reference table 204D including contents of the data corresponding to the switching bits is used. The reference table can be configured as a part of the RAM 204C or an other memory device such as Electrically Erasable Programmable ROM (EEPROM) in the communication frame processing circuit 204 as shown in FIG. 2B.

Next, the communication frame processing circuit 204 judges whether the decoded signal switching data includes data of which content is not updated for three seconds or more (Step 203). When the data of which the content is not updated is present, the judgment is YES. The communication frame processing circuit 204 sets the content of the data to a predetermined default value (Step 204). The pieces of data read at Step 201 and the pieces of data decoded at Step 202 are sent to the power generation voltage and excitation current controlling circuit 206 and used as parameters for power generation control.

Subsequently, or when the data of which the content is not updated for three seconds or more is not present and the judgment at Step 103 is NO, the communication frame processing circuit 204 acquires the diagnosis information, the power generation voltage, the excitation current, the F duty, and the like, and composes the ID2 communication frame (Step 205). The composed ID2 communication frame is transmitted from the communication controlling circuit 209 to the ECU 5 via the C terminal (Step 206). The communication frame processing circuit 204 composes the ID3 communication frame including the supplier information, the power generator type, and the signal switching bit and the signal switching data read at Step 201 (Step 207). The composed ID3 communication frame is transmitted from the communication controlling circuit 209 to the ECU 5 via the C terminal (Step 208). As a result of receiving the ID3 communication frame, the ECU 5 can monitor whether erroneous signal switching bit and signal switching data are sent. When the ECU 5 judges that an erroneous signal is sent, the ECU 5 retransmits a correct signal using the next ID1 communication frame.

In this way, the power generation controlling device 2 can transmit many types of signal switching data by the signal switching data and the signal switching bit being included within the communication frame and the contents of the signal switching data being switched based on the signal switching bit. As a result, communication delay can be suppressed. Because transmission and reception of communication frames can be performed using a conventionally used communication schedule, the communication schedule does not become complicated. Moreover, as a result of power generation control information requiring communication speed being preferentially included in the communication frame as the signal switching data, the required communication speed can be ensured. High-quality communication including many types of power generation control information can be performed.

In the power generator 1 that used in harsh noise and temperature environments, the contents of the signal switching data held by the power generation controlling device 2 may be changed as a result of external noise. However, even in such instances, power generation control can be performed based on default values after a predetermined period by contents of the signal switching data that are not updated being periodically set to the default values. Therefore, reduced power generation states and excessive voltage states do not continue for long periods of time. Serious damage, such as breakdown while on a road caused by a dead battery, can be prevented from occurring.

The signal switching data received by the power generation controlling device 2 is transmitted towards the ECU 5 at a next transmission timing. Even when the signal switching data including content that is erroneous due to external noise is received by the power generation controlling device 2, because the erroneous content is sent to the ECU 5 at the next transmission timing, the ECU 5 can retransmit the signal switching data including correct contents. As a result, breakdown while on a road caused by a continuous abnormal power generation state can be prevented from occurring.

The present invention is not limited to the above-described embodiment. Various modifications falling within the scope of the spirit of the invention can be made. For example, according to the embodiment, specific examples of the contents of the ID1 communication frame, the ID2 communication frame, and the ID3 communication frame are indicated in FIGS. 2 to 5. However, additions can be made to the contents, and the contents can be changed and deleted, accordingly.

As a modification, the communication frame processing 204 and the communication control circuit 209 may be composed using one computer system, instead of the separate two computer systems described in the foregoing embodiment. As another modification can also be provided. That is, in the present invention, it is not always limited to produce the communication frame by the processing circuit 204 and the communication control circuit 209 using the computer systems, but these circuits 204 and 209 may be produced using analogue and/or logic components, as long as those components are combined to provide the same or equivalent functions as or to those gained by those circuits 204 and 209.

What is claimed is:

1. A power generation controlling device which is mounted on a vehicle and which controls a power generation state of a power generator by intermittently applying an excitation current flowing to an excitation winding of the power generator, the power generation controlling device comprising:

a communication controlling means that performs bi-directional, serial communication with an external controlling device arranged externally to the power generation controlling device and the power generator, the external controlling device periodically transmitting a communication frame having switching information and power generation control information, and receives the communication frame periodically sent from the external controlling device, wherein the power generation control information is used for controlling the power generation and is given as a content selected from two or more types of contents by specifying a content of the switching information, and the switching information and the power generation control information selected by specifying the content of the switching information are included in the same communication frame;

a communication frame processing means that specifies the content of the power generation control information based on the switching information and decodes the specified power generation control information; and a power generation controlling means controls power generation of the power generator based on the power generation control information which content is specified by the communication frame processing means.

2. The power generation controlling device according to claim 1, wherein content of the power generation control information being specified based on the switching information is reset to a default value when the content is not indicated by the external controlling device for a predetermined period.

3. The power generation controlling device according to claim 2, wherein the communication controlling means transmits the received switching information towards the external controlling device at a next transmission timing.

4. The power generation controlling device according to claim 1, wherein the communication controlling means transmits the received switching information towards the external controlling device at a next transmission timing.

5. The power generation controlling device according to claim 1, wherein the communication frame processing means is configured to generate a plurality of communication frames in response to the communication frame periodically sent from the external controlling device, and transmits the generated communication frames to the external controlling device within a communication cycle in which the communication is triggered by the reception of the communication frame periodically sent from the external controlling device and the communication is performed sequentially in time and is ended by transmitting of the generated communication frames.

6. The power generation controlling device according to claim 5, wherein the communication controlling means sends back the received switching information included in a transmission frame generated by the communication frame processing means, towards the external controlling device within the same communication cycle in which the switching information is received.

* * * * *